Dec. 1, 1942.    C. T. HIBBARD    2,303,361
ELECTROMAGNETIC DRIVE
Filed April 10, 1940    2 Sheets-Sheet 1
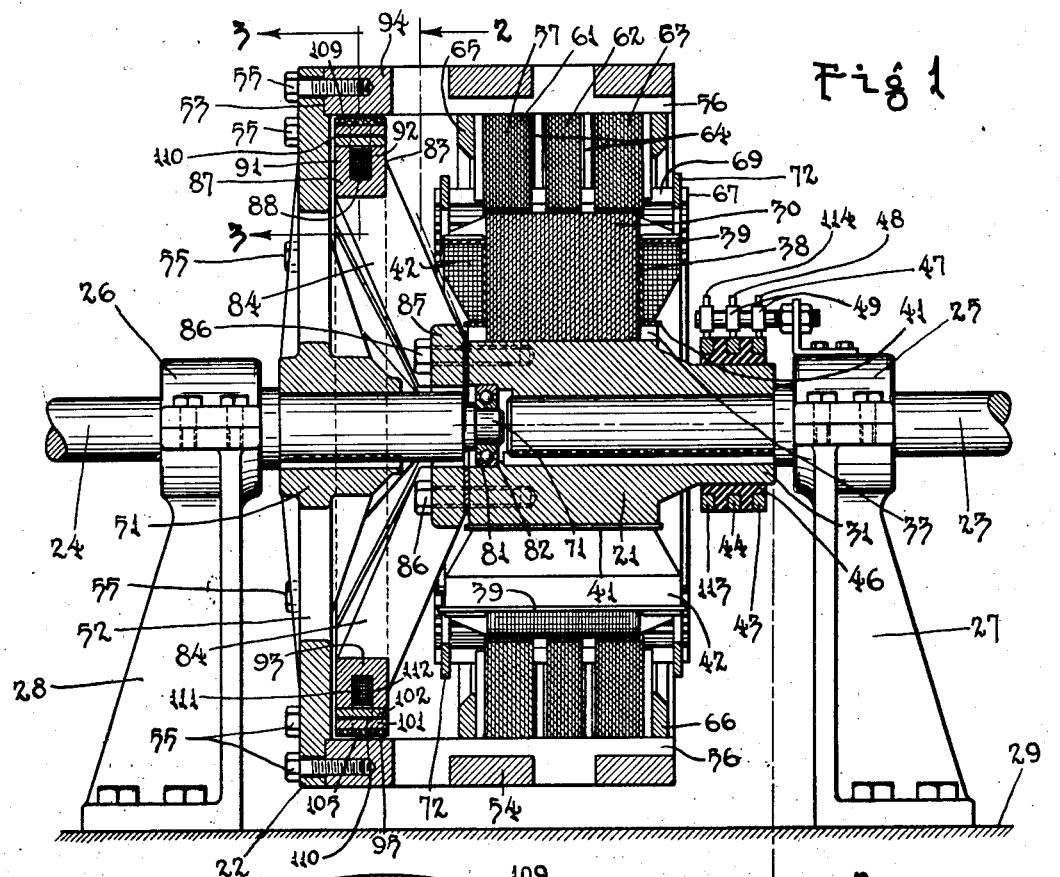
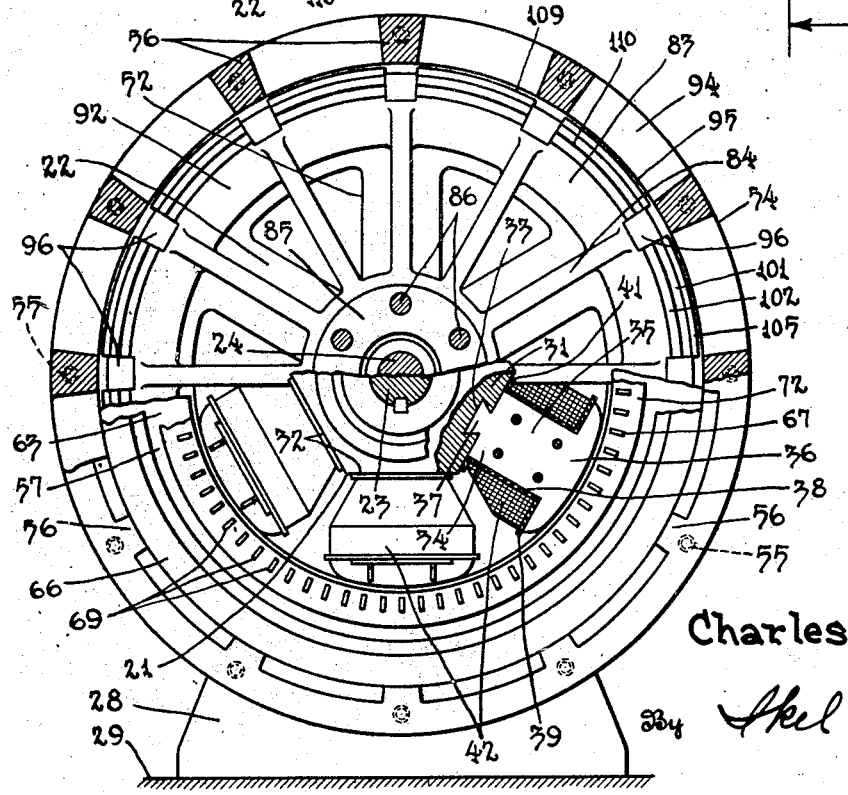
Inventor
Charles T. Hibbard
By Akel C. Benson
His Attorney Dec. 1, 1942.     C. T. HIBBARD     2,303,361
ELECTROMAGNETIC DRIVE
Filed April 10, 1940     2 Sheets-Sheet 2
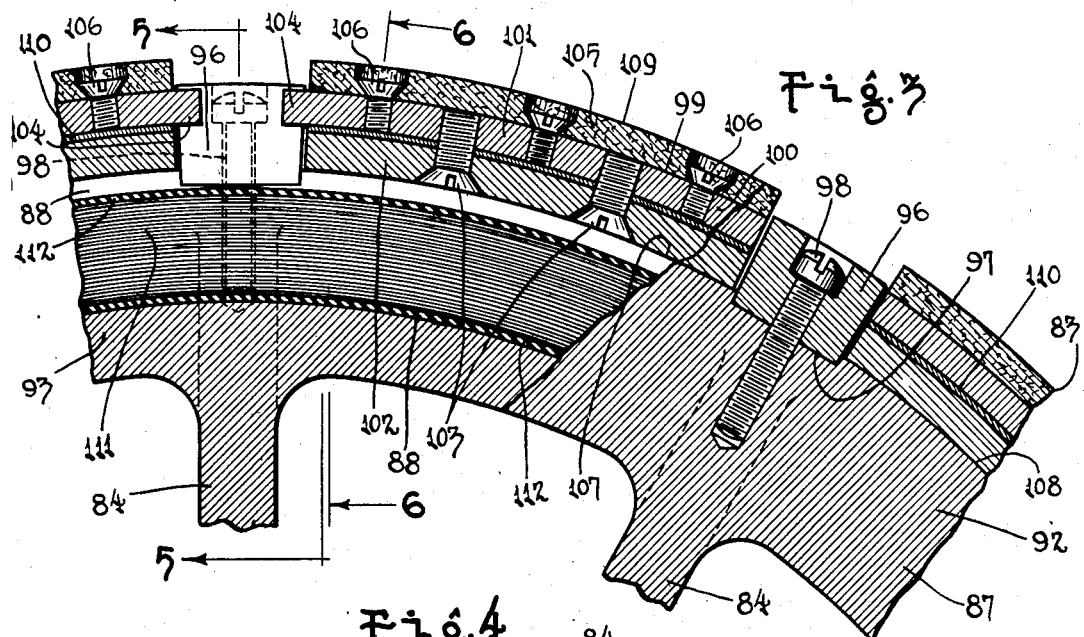
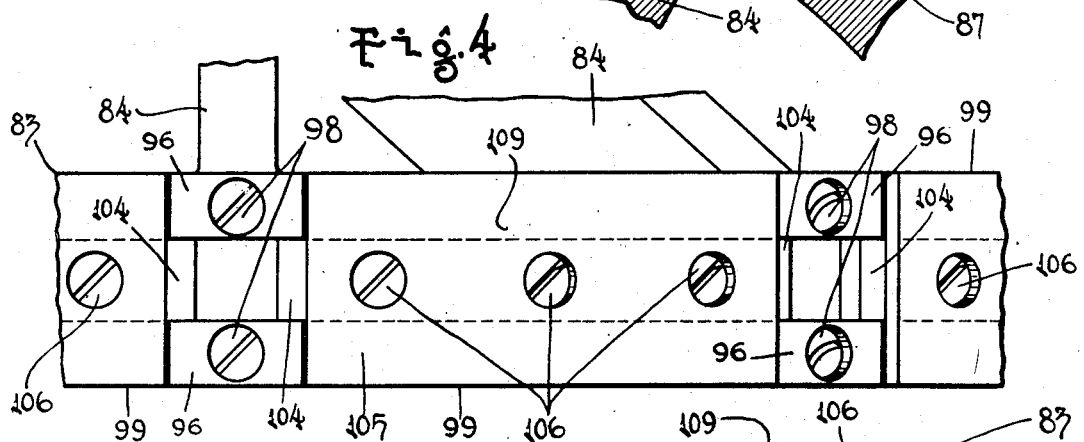
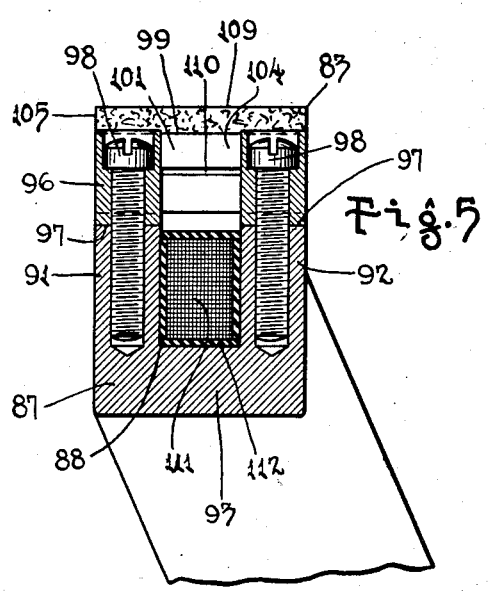
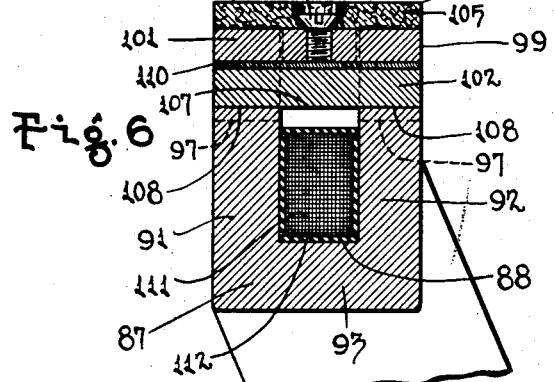
Inventor
Charles T. Hibbard
By Akel C. Benson
His Attorney Patented Dec. 1, 1942

2,303,361

UNITED STATES PATENT OFFICE 2,303,361

ELECTROMAGNETIC DRIVE

Charles T. Hibbard, Minneapolis, Minn., assignor to Electric Machinery Mfg. Company, Minneapolis, Minn.

Application April 10, 1940, Serial No. 328,936

10 Claims. (Cl. 192—103)

My invention relates to electromagnetic drives and has for an object to provide an electromagnetic drive having two relatively rotatable members capable of being operated at various relative speeds over a wide range.

Another object of the invention resides in providing means for mechanically connecting said members together when desirable to cause the same to rotate substantially in unison.

An object of the invention resides in providing means for procuring gradual reduction in relative speed between the rotatable members to substantially zero relative speed.

A still further object of the invention resides in providing an electromagnetic drive in which the two relatively rotatable members, when operating at substantially the same speed, require no electric energization.

A feature of the invention resides in providing an electromagnetic drive in which the two relatively rotatable members are connected together through a clutch having one or more movable clutch elements operated by centrifugal force to effect the desired connection.

An object of the invention resides in providing electromagnetic means for disengaging the clutch elements.

Another object of the invention resides in providing one of the members with an element having an annular friction surface and the other member with one or more shoes having clutch elements adapted to be moved into engagement with said surface by centrifugal force.

A feature of the invention resides in providing electromagnetic means acting upon said shoes for disengaging the clutch elements thereof from said friction surface.

A feature of the invention resides in providing a single electromagnet for operating upon all of said shoes to procure disengagement from said friction surface.

A feature of the invention resides in mounting the shoes so that they float and readily adapt themselves to the friction surface so as to procure uniform pressure upon the surface throughout the area of each shoe.

Other objects of the invention reside in the novel combination and arrangement of parts and in the details of construction hereinafter illustrated and described.

In the drawings:

Fig. 1 is a longitudinal elevational sectional view of an electromagnetic drive illustrating an embodiment of my invention.

Fig. 2 is an elevational sectional view of the electromagnetic drive taken on line 2—2 of Fig. 1.

Fig. 3 is a fragmentary elevational sectional view taken on line 3—3 of Fig. 1 with a portion of the structure removed.

Fig. 4 is a plan view of the structure shown in Fig. 3.

Fig. 5 is a cross sectional view taken on line 5—5 of Fig. 3.

Fig. 6 is a cross sectional view taken on line 6—6 of Fig. 3.

In the drawings I have shown a form of my invention which utilizes two rotatable members 21 and 22 which are co-axially disposed and which are rotatable relative to one another. The member 21 is driven from the source of mechanical power and the member 22 drives the load connected to it. The member 21 is mounted on a shaft 23, while the member 22 is mounted on another shaft 24. These shafts are respectively journaled in bearings 25 and 26 carried by standards 27 and 28 mounted on a base 29. The two shafts 23 and 24 are concentric. In the drawings only one bearing has been shown for each shaft. In practice the bearings of the load and the source of mechanical power may be used to further support the respective shafts. If this becomes impractical it may be readily comprehended that additional bearings may be used if found desirable. The specific construction of the members 21 and 22 will now be described in detail.

The member 21 is constructed with a hub 31 which is keyed to the shaft 23. This hub is polygonal in form, having a number of faces 32 extending about the periphery thereof. In these faces are formed dove-tailed slots 33. Attached to the hub 31 are a number of laminated poles 34, each of which has a body 35 and a pole tip 36 at the outermost portion thereof. Each of these poles is further constructed with a dove-tailed tongue 37 which is received in one of the slots 33 whereby the pole is affixed to the hub 31. The poles 34 and the hub 31 constitute the core structure of the revoluble member 21 which is indicated in its entirety by the reference numeral 30. The number of poles employed depends upon the speed at which the driven member of the electromagnetic drive is to be operated. I have found that highly satisfactory results are produced where the number of poles are the same as used with a synchronous motor of corresponding speed and operating from a 60 cycle source of electric power.

The windings of the member 21 are constructed as follows: On each of the poles 34 is mounted a coil 42. Inasmuch as all of the coils are identical in construction, the description thereof will not be repeated and only the coil shown on the pole illustrated in cross section will be described. Mounted on the pole body 35 is a spool 38 of insulating material which has ends 39 and 41 fitting against the face 32 of the hub 31 and against the inner surface of the pole tip 36. On the spool 38 and between the ends 39 and 41 is wound the coil 42 which is constructed of insulated copper wire. This coil is preferably constructed tapered at its inner end to provide sufficient space for ventilation between the coils on the respective poles. The various coils 42 are connected together in reverse relation so that alternate poles are of like polarity and so that the intervening poles are also of the same polarity but of a polarity opposite to that of the other poles.

The ends of the coils 42 are connected to two collector rings 43 and 44 which are mounted on an insulating ring 46 secured to the hub 31 of the member 21. These rings have contacting therewith brushes 47 and 48 which are carried by brush holders 49 attached to the bearing 25. The brushes 47 and 48 are connected to a source of direct current and the amount of current flowing therefrom is controlled by a rheostat connected in series with the lead from the brush 47, the rheostat not being shown in the drawings. A suitable switch, not shown, is also connected in this lead. By means of this construction any desired amount of current may be supplied to the coils 42 so that the field strength produced thereby can be varied, as required. A rheostat having a large number of taps may be used so that fine adjustment of the field current in the coils 42 may be had. The best results are procured with a coarse and a fine rheostat of well known construction connected in series relationship, the rheostats being independently adjustable.

The member 22 is provided with a hub 51 which has a ring spider 52 connected therewith and issuing outwardly therefrom. This hub is mounted on the shaft 24 and is keyed thereto. The spider 52 is constructed at its outer end with a rabbet 53 in which is mounted an annular frame 54. Said frame is secured to the spider 52 by means of cap screws 55 which extend through said spider and are screwed into the frame. The frame 54 has ribs 56 formed upon the inner periphery thereof which are accurately bored to receive the core structure 57 of the member 22. Core structure 57 is annular in form and is constructed in three sections 61, 62 and 63 which are held in spaced relation by means of spacers 64. The core structure 57 fits snugly within the ribs 56 and is held attached thereto by means of annular end plates 65 and 66 which are welded to the said ribs 56.

Associated with the core structure 57 is a squirrel cage winding 67. This winding consists of a number of bars 69 which are disposed in suitable slots in the various core sections 61, 62 and 63. These bars are connected together at their ends exteriorly of the core structure by means of end rings 72. The number of bars used may be determined in accordance with the usual practice in the design of induction motors.

For the purpose of maintaining concentricity between the rotatable members 21 and 22 the end of the shaft 24 is reduced in diameter, as designated at 71, to receive the inner race of a ball bearing 81. This bearing is mounted in a recess 82 formed in the hub 31 at the end of shaft 23. By means of this construction the two shafts are maintained concentric within the electromagnetic drive so that the air gap between the core structure 57 and the core structure 30 remains constant.

In conjunction with the two rotatable members 21 and 22, I employ a clutch which I have indicated in its entirety by the reference numeral 83. This clutch utilizes a spider 84 provided with a hub 85 relatively flat. The hub 85 is secured to the hub 31 by means of cap screws 86. The spider 84 includes an annulus 87 which is formed with a perimetrically extending groove 88 by means of which the said annulus becomes U-shaped in cross section. This forms in the annulus two flanges 91 and 92 with an inner connecting portion 93 there-between. The annulus 87 is disposed in proximity to the inner portion of the annular frame 54, which portion is indicated by the reference numeral 94 and has the form of a ring with an inner friction surface 95.

Secured to the flanges 91 and 92 of the annulus 87 at spaced intervals along the same are pairs of lugs 96. These lugs are set into recesses 97 formed in the said flanges and are secured in place by means of cap screws 98 threaded into said flanges. By means of the recesses 97, the lugs 96 are held from movement in a circumferential direction. The lugs 96 are preferably constructed of brass or some other suitable non-magnetic material for a purpose to be presently explained.

Between the lugs 96 are provided a number of arcuate shoes 99 which are best shown in Figs. 3, 4, 5 and 6. Inasmuch as all of these shoes are identical in construction only the shoe illustrated in Figs. 5 and 6 will be described in detail. This shoe consists of a body 100 having an outer arcuate part 101 and an inner arcuate part 102. The curvature of the inner surface 107 of the inner part 102 of shoe 99 is the same as the outer surface 108 of the flanges 91 and 92. These shoe parts are secured together by means of screws 103 which extend through the part 102 and are threaded into the part 101. The part 102 of shoe 99 overlies the outer periphery of the two flanges 91 and 92. The part 101 of said shoe has formed on the ends thereof ears 104 which fit in between the pairs of lugs 96. The shoes 99 are of such length that the ends of the parts 101 and 102 thereof fit freely against the lugs 96. By means of this construction, the shoes are held from axial and peripheral movement but are free to move radially.

Attached to the part 101 of shoe 99 is a facing 105 constructed of a suitable friction material such as used for brake linings and similar purposes. This facing is attached to the part 101 by means of screws 106 which extend partly through said facing and are threaded into said part. The dimensions of the parts are such that, when the inner arcuate surface 107 of the shoe body 102 is in contact with the outer surface 108 of the flanges 91 and 92, the outer friction surface 109 of the facing 105 is spaced from the friction surface 95 of the ring 94.

In order to compensate for wear of the facings 105, the body of the shoe 99 is constructed with the two parts 101 and 102 previously referred to. As the surface 109 of facing 105 wears, shims such as indicated at 110, are placed between the parts 101 and 102. Thus the outer surface of the facing 105 is brought into the desired proximity to the friction surface 95 of the ring 94.

In the construction of the shoes 99, certain of the shoes are made of different weights than the remaining shoes. This may be accomplished by increasing or decreasing the width of the shoe bodies or by drilling out portions of the same. The purpose of so constructing the shoes will be subsequently explained in detail.

Within the groove 88 in the annulus 87 is wound a coil 111 of suitable insulated copper wire. This coil is insulated by means of insulation 112 from the walls of the groove 88. The ends of this coil pass through suitable holes drilled in the flange 92 and are connected to the collector ring 44 and to another collector ring 113, also mounted on the insulating ring 46, previously referred to. A brush 114 contacts with the ring 113. A suitable switch is connected in the lead from the brush 114 and also a rheostat similar to that previously described. Both of the leads from the brushes 114 and 47 may be connected to the same side of the power line used for energizing the various coils with direct current, and a single lead from the brush 48 is connected to the other side of the power line. In this manner the coils 42 and the clutch coil 111 may be separately energized and controlled as desired.

Since the lugs 96 are constructed of non-magnetic material, a magnetic path is formed through the flanges 91 and 92 of annulus 87, the air gap between the surfaces 107 and 108 and the part 102 of the shoe body 100 which causes the shoes to be attracted by the annulus when coil 111 is energized.

In the operation of my invention, coil 111 is first energized. This causes the two flanges 91 and 92, which serve as poles of an electromagnet, to draw the shoes 99 toward the same so that the surfaces 107 of said shoes engage the surfaces 108 of the flanges 91 and 92. This disengages the facings 105 from the friction surface 95 of ring 94. The shaft 23 is then driven from the source of mechanical power from which variable speed is desired. This source may be a prime mover, such as a synchronous motor, or any other source of rotating mechanical power. After the shaft 23 has been brought up to its required speed, the coils 42 on the core structure 30 are energized by passing current through the brushes 47 and 48. The current so provided is controlled as previously explained. Due to the rotation of the core structure 30, alternating current is induced in the squirrel cage bars 69. This produces torque between the two members, and thereby the shaft 24 is caused to rotate with the shaft 23. As the current delivered to the coils 42 is varied by the rheostat the relative speed between the rotatable member 22 and the rotatable member 21 is controlled. The windings 42 and the squirrel cage bars 69 are so constructed that the transmission may be operated continuously. It thus becomes apparent that the shaft 24 may be driven at any desired speed for any desired length of time. As the current in the coils 42 is increased, the shaft 24 reaches a speed closer to that of the shaft 23. The maximum speed obtainable for the shaft 24 by this means is, however, only in the vicinity of 95% to 97% of the speed of the shaft 23. Where it becomes desirable to run the shaft 24 at the same speed as the shaft 23, the clutch 83 is employed. While the coils 42 are still energized, the current in the winding 111 is reduced. If this current is reduced rapidly or shut off instantaneously, the attractive force of the magnet formed by the annulus 87 is removed and centrifugal force throws the shoes 99 outwardly bringing the surfaces 109 of the facings 105 into engagement with the friction surface 95 of ring 94. This produces a clutching connection between the revoluble members 21 and 22, and the said members then travel in unison. I have found that in ordinary practice a slip of less than three hundredths of one per cent can be procured at full load.

If, on the other hand, gradual change from the maximum speed obtainable through the electromagnetic drive to the speed of the driving shaft is desired, the rheostat used in conjunction with the winding 111 is utilized. As the current in the winding 111 is gradually reduced, the heavier of the shoes 99 are first released through the action of centrifugal force and engage the ring 94 to produce partial clutching. Thus a force less than that procured by all of the shoes is obtainable and the slip between the members 21 and 22 is partially reduced. As the current in the winding 111 is further reduced the other shoes are brought into action and when the current is finally shut off all of the shoes act as previously described to substantially lock the members 21 and 22 together. In either case when the members 21 and 22 are traveling in unison, the coils 42 are disconnected from the source of energy. It will thus be seen that no electrical energy is used when the shafts travel in unison.

The advantages of my invention are manifest. By means of the construction disclosed the electromagnetic drive may be used to procure any speed up to substantially the speed of the driving member. When the driven member is connected to the driving member through the clutch employed, no exciting current is used either for the electromagnetic drive or for the clutch. Inasmuch as the load is usually driven for the greatest length of time at full speed it will thus become apparent that my invention is economical since no current is consumed at full speed. When, however, a condition arises in which a speed less than full speed is desired the same can be readily and easily procured. With my invention the load can be started from rest with a minimum amount of power and gradually brought up to any desired speed including the speed of the driving member. It will thus become apparent that power units of less capacity will be required than where the motor or other power unit is directly connected to the load and must start the load from rest. By means of my invention the load may be operated continuously at any desired speed within the limits of the drive. By means of the lugs employed for engagement with the clutch shoes the shoes are freely movable in a radial direction and are restrained from movement in a lateral direction and in a peripheral direction. Thus the shoes readily accommodate themselves to the contour of the surface of the ring with which they engage and compensate for misalignment of the shafts and other irregularities in the construction and assembly of the parts. By employing shoes of different weights, either rapid or gradual acceleration to maximum speed can be procured. By properly selecting the weights of the shoes the clutch can be used for overload purposes, the clutch commencing to slip when the load exceeds that desired.

Changes in the specific form of my invention, as herein disclosed, may be made within the scope of what is claimed without departing from the spirit of my invention.

Having described my invention, what I claim as new and desire to protect by Letters Patent is:

1. A clutch comprising two relatively rotatable members, one of said members having an inwardly facing friction surface, the other of said members having an annulus of magnetic material U-shaped in cross section to provide an annular groove extending about the same, a coil in said groove, a clutch shoe of magnetic material overlying said annulus and adapted to be attracted to the same, means for holding said clutch shoe in position relative to said annulus, and a facing on said clutch shoe for engagement with said surface, said shoe being adapted to be moved outwardly by centrifugal force due to its own weight to procure engagement of said facing with said surface.

2. A clutch comprising two relatively rotatable members one of said members having an inwardly facing friction surface, the other of said members having an annulus of magnetic material U-shaped in cross section to provide an annular groove extending about the same, a coil in said groove, a clutch shoe of magnetic material overlying said annulus and adapted to be attracted to the same, lugs extending outwardly from said annulus, said shoe engaging said lugs and being restrained from movement circumferentially of said annulus thereby, and a facing on said shoe for engagement with said surface, said shoe being adapted to be moved outwardly by centrifugal force due to its own weight to procure engagement of said facing with said surface.

3. A clutch comprising two relatively rotatable members, one of said members having an inwardly facing friction surface, the other of said members having an annulus of magnetic material U-shaped in cross section to provide an annular groove extending about the same, a coil in said groove, a clutch shoe of magnetic material overlying said annulus and adapted to be attracted to the same, lugs extending outwardly from said annulus, said clutch shoe engaging said lugs and being restrained from movement circumferentially of said annulus thereby, ears on said shoe for engagement with said lugs for restraining said shoe from lateral movement, and a facing on said shoe for engagement with said surface, said shoe being adapted to be moved outwardly by centrifugal force to procure engagement of said facing with said surface.

4. A clutch comprising two relatively rotatable members, one of said members having an inwardly facing friction surface, the other of said members having an annulus of magnetic material U-shaped in cross section to provide an annular groove extending about the same, and to provide spaced flanges on opposite sides of said grooves formed with surfaces facing said first named surface, a clutch shoe constructed of magnetic material overlying the surfaces of said flanges, circumferentially spaced lugs extending outwardly from said flanges, the lugs on one flange being disposed opposite the lugs on the other flange, the ends of said shoe engaging said lugs, ears on the ends of said shoes for engagement between said lugs, and a facing on said shoe for engagement with said first named surface, said shoe being adapted to be moved outwardly by centrifugal force to procure engagement of said facing with said first named surface.

5. A clutch comprising two relatively rotatable members, one of said members having an inwardly facing friction surface, the other of said members having an annulus of magnetic material U-shaped in cross section to provide an annular groove extending about the same, and to provide spaced flanges on opposite sides of said grooves formed with surfaces facing said first named surface, a clutch shoe constructed of magnetic material overlying the surfaces of said flanges, circumferentially spaced lugs extending outwardly from said flanges, the lugs on one flange being disposed opposite the lugs on the other flange, said lugs being constructed of nonmagnetic material, the ends of said shoe engaging said lugs, ears on the ends of said shoes for engagement between said lugs, and a facing on said shoe for engagement with first said named surface, said shoe being adapted to be moved outwardly by centrifugal force to procure engagement of said facing with said first named surface.

6. A clutch comprising two relatively rotatable members, one of said members having an inwardly facing friction surface, the other of said members having an annulus of magnetic material U-shaped in cross section to provide an annular groove extending about the same, a coil in said groove, a clutch shoe of magnetic material overlying said annulus and adapted to be attracted to the same, the body of said clutch shoe being constructed of two separable parts adapted to receive a shim therebetween, means for holding said parts detachably connected together, means for holding said clutch shoe in position relative to said annulus, and a facing on said shoe for engagement with said surface, said shoe being adapted to be moved outwardly by centrifugal force to procure engagement of the facing with said surface, said shim being arcuate and being situated concentrically with the engaging surface of said facing.

7. In combination, a rotatable driving member, a rotatable driven member, an internal friction surface on one of said members, an annulus on the other of said members within said internal friction surface, a plurality of shoes carried by said annulus and movable radially outward therefrom by centrifugal force into engagement with said friction surface, and electro-magnetic means within said friction surface and carried by said annulus for variably restraining such outward movement of said shoes.

8. A variable speed drive comprising a rotatable driving member, a rotatable driven member, an internal friction surface on one of said members, a plurality of shoes of different weight carried by the other of said members and independently movable outward therefrom by centrifugal force into engagement with said friction surface, and means for successively restraining such outward movement of said shoes while said members are rotating to procure successive engagement of the shoes with the friction surface.

9. In combination, a rotatable driving member, a rotatable driven member, one of said members having an annular portion providing an internal friction surface, an annulus on the other of said members within said internal friction surface, said annulus having U-shaped cross section to provide an annular groove extending about the same and to provide spaced flanges facing said first named friction surface, a clutch shoe constructed of magnetic material overlying the surfaces of said flanges, means on said annulus for restraining relative rotation between said shoe and annulus, said shoe being adapted to be moved outwardly by centrifugal force, and a coil within said annulus for moving said shoe radially inwardly away from said friction surface.

10. In combination, a rotatable driving member, a rotatable driven member, one of said members having an annular portion providing an internal friction surface, an annulus on the other of said members within said internal friction surface, said annulus having U-shaped cross section to provide an annular groove extending about the same and to provide spaced flanges facing said first named friction surface, a clutch shoe constructed of magnetic material overlying the surfaces of said flanges, means on said annulus for restraining relative rotation between said shoe and annulus, said shoe being adapted to be moved outwardly by centrifugal force, a coil within said annulus for moving said shoe radially inwardly away from said friction surface, and means for varying the current flowing through said coil to vary the frictional engaging force between said shoe and friction surface.

CHARLES T. HIBBARD.